United States Patent [19]
Springer et al.

[11] Patent Number: 5,478,638
[45] Date of Patent: Dec. 26, 1995

[54] REINFORCED CONVEYOR BELT COMPRISING A MULTI-LAYER STRUCTURE WITH AT LEAST ONE INTERMEDIATE FABRIC LAYER CONTAINING SPACED REINFORCING STEEL RODS IN THE WEFT OF THE FABRIC LAYER

[76] Inventors: Gary B. Springer, 4617 Perry Ct., Columbia, S.C. 29206; John E. Hayes, Jr., Rte. 2, Box 490, Newberry, S.C. 29108

[21] Appl. No.: 275,789

[22] Filed: Jul. 15, 1994

[51] Int. Cl.$^6$ .............................. F16G 1/04; F16G 1/10; B32B 7/00

[52] U.S. Cl. .................... 428/248; 428/250; 428/257; 428/259; 428/263; 428/909; 474/266; 474/267; 474/268; 474/271

[58] Field of Search ............................. 428/259, 248, 428/250, 909, 257, 263; 474/266, 267, 268, 271

[56] References Cited

U.S. PATENT DOCUMENTS

| | | | |
|---|---|---|---|
| 26,731 | 12/1869 | Robinson | 161/57 |
| 204,368 | 5/1878 | Petchell | 474/270 |
| 2,732,930 | 1/1956 | Thomson | 198/201 |
| 3,144,930 | 8/1964 | Michels | 198/193 |
| 3,323,637 | 6/1967 | Jenkins | 198/193 |
| 3,973,670 | 8/1976 | Spaar | 198/193 |
| 4,411,947 | 10/1983 | Heynhold | 428/250 |
| 4,637,511 | 1/1987 | Johnson et al. | 198/846 |
| 4,650,068 | 3/1987 | Vanassche et al. | 198/847 |
| 4,957,199 | 9/1990 | Wokke et al. | 198/847 |

*Primary Examiner*—James D. Withers
*Attorney, Agent, or Firm*—Michael A. Mann

[57] ABSTRACT

A reinforced conveyor belt especially suited to transport sharp objects such as glass and scrap metal. The belt has a top and bottom layer of flexible, abrasion-resistant material, such as rubber. There is a middle layer of woven, multi-layered fabric, preferably made of cotton threads with reinforcing rods interwoven therein. The reinforcement rods run transversely and occupy sites in the intermediate layers of the fabric normally occupied by weft threads. Interweaving the layers of fabric and inserting the rod into one of the intermediate fabric layer provides the belt with tensile strength, puncture resistance, and a barrier against longitudinal tearing. Finally, the bottom surface of the belt is textured to provide additional durability and traction.

18 Claims, 2 Drawing Sheets

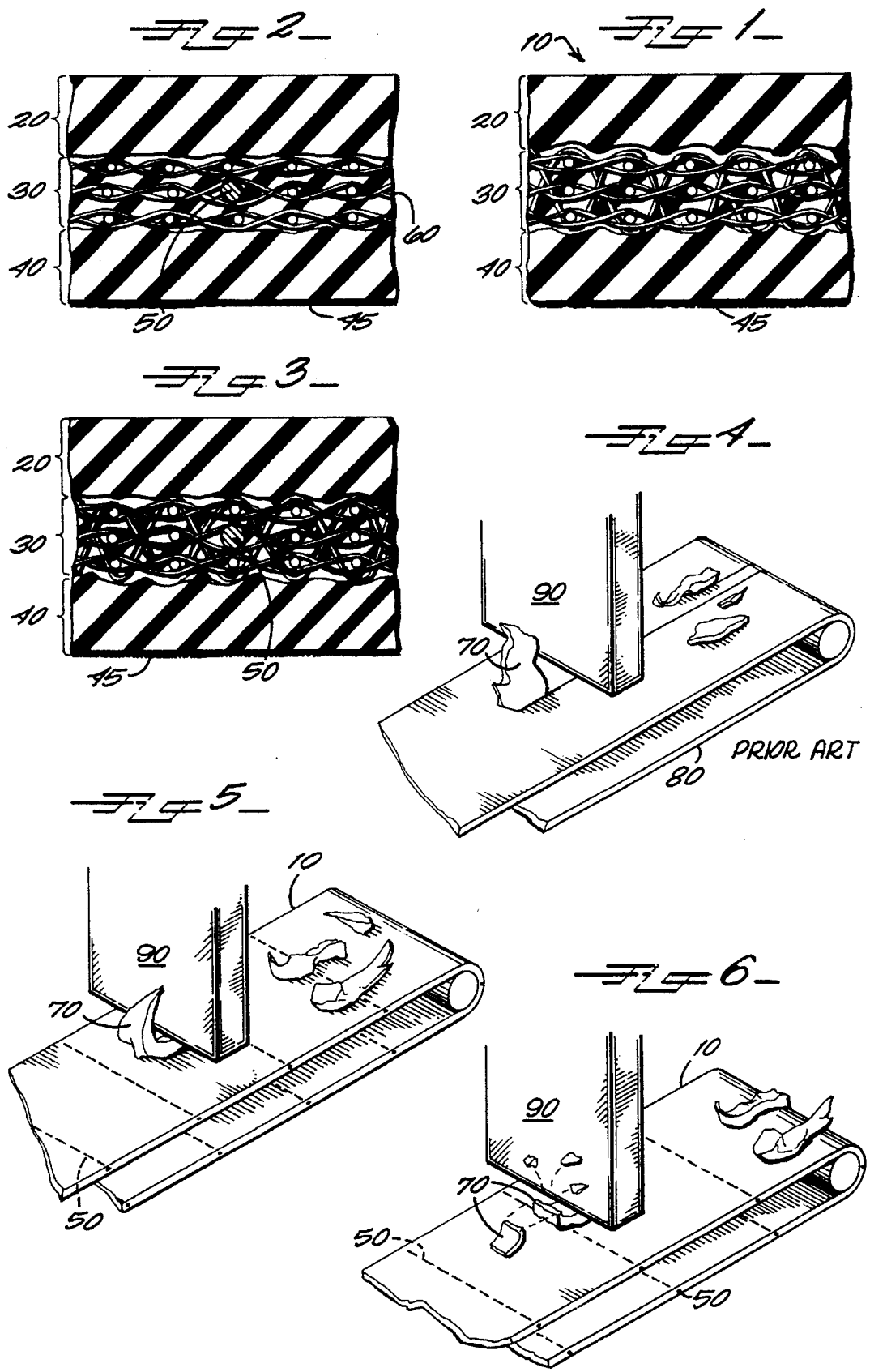

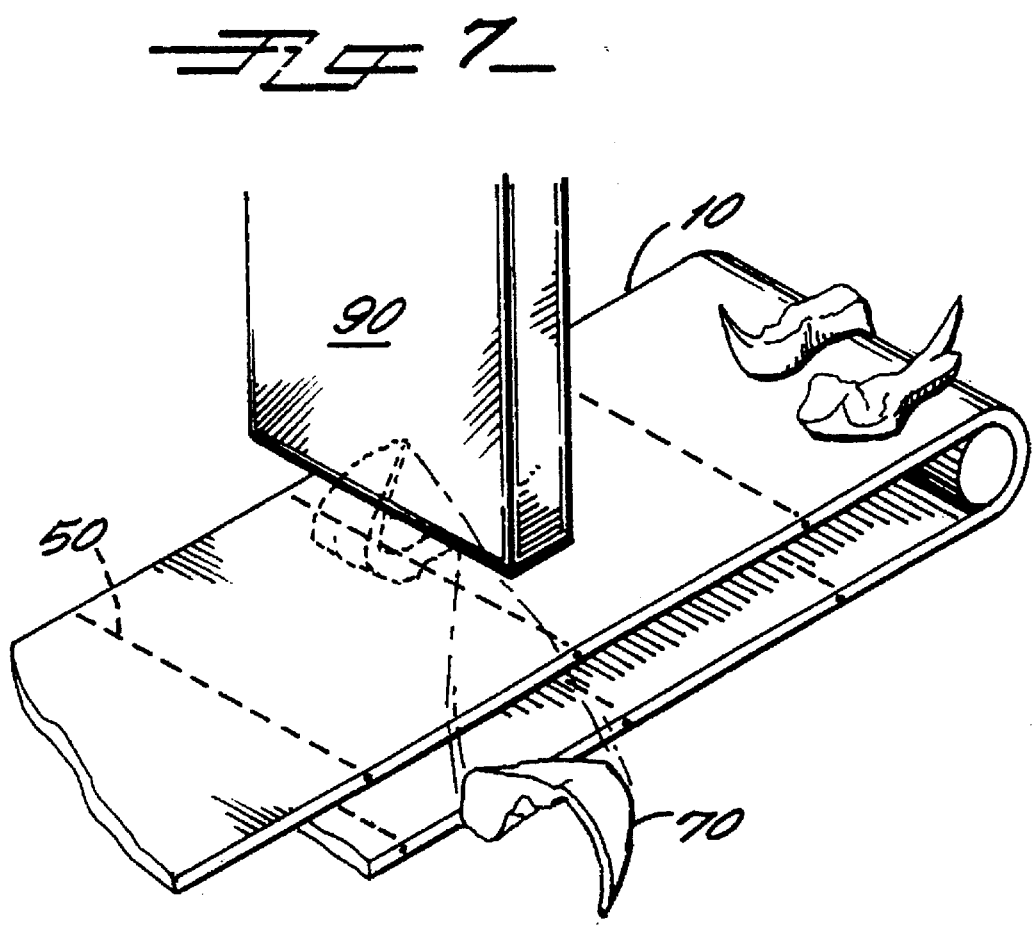

REINFORCED CONVEYOR BELT COMPRISING A MULTI-LAYER STRUCTURE WITH AT LEAST ONE INTERMEDIATE FABRIC LAYER CONTAINING SPACED REINFORCING STEEL RODS IN THE WEFT OF THE FABRIC LAYER

BACKGROUND OF THE INVENTION

1. Field of the Invention

The present invention relates generally to conveyor belts. In particular, the present invention relates to multi-layered conveyor belts with reinforcing tier heavy-duty use.

2. Discussion of Background

In addition to simple wear, belts used to convey objects can be damaged in a number of ways. The objects they convey are a big factor in the type of damage. Broken glass and scrap metal, for example, can do a lot of damage to a conveyor belt very quickly. The following is a brief review of the sources of damage from objects generally.

In most industrial situations requiring the use of conveyor belts, the objects to be conveyed are dropped onto the conveyor belt from a stationary bin or hopper. Normally, such holding devices are a distance above the conveyor and consequently, when a load is delivered to the conveyor, it imparts impact stress upon the belt. Repeated load applications cause deformation and eventually stress failure. Thus, in order to have a long useful life, a belt must be able to withstand repeated stress applications.

Puncturing is another problem commonly encountered in the use of belts. When dropping sharp objects such as glass, stone, coal, or scrap metal onto the belt, the sharp edges penetrate the surface of the belt. Upon removal, such objects may make a hole or tear in the belt. Successive load applications containing sharp objects increase the number of punctures suffered by the belt and reduce its strength. Eventually, unless repairs are made, the belt will fail.

Another problem caused by the transportation of sharp objects is longitudinal splitting. Often it occurs that a sharp object penetrates the entire depth of the belt, that is, the object protrudes through to the bottom side of the belt. As the object is being conveyed, it may engage a structure or piece of equipment just above the conveyor (a "pinch" point). The object then is held stationary by the equipment as the belt continues to move. The object shears the belt longitudinally as long as it is held by the equipment. FIG. 4 illustrates this problem. As can be seen, sharp object 70 has penetrated prior art belt 80 and became lodged between belt 80 and structure 90. As belt 80 moves, it is longitudinally split by object 70.

There exists in the art many conveyor belts that have attempted to solve the above mentioned problems. It is known to provide a conveyor belt with reinforcing fabrics and rods. However, prior to the instant invention, there exists no conveyor belt which adequately solves the above mentioned problems, in the manner described in the specification, while maintaining flexibility, low weight and ease of manufacture.

SUMMARY OF THE INVENTION

According to its major aspects and briefly described, the present invention is a reinforced conveyor belt particularly suited for conveying loads of sharp material such as glass and scrap metal. The reinforced belt comprises a first layer of abrasion resistant material on which the objects to be conveyed are placed. A second layer of woven, multi-layered fabric gives the belt increased tensile strength and puncture resistance. Interwoven in the second layer is a plurality of reinforcement rods. These rods, positioned within the fabric itself such that each rod occupies a weft thread site, run transverse through a middle layer of the fabric and are spaced an equal distance apart. The third layer of the belt is also an abrasion resistant material, and has a textured outer surface for better wear and traction.

The first and third layers are important features of the present invention. Preferably made of rubber, these layers give flexibility and slip resistance to the belt, while providing some resistance to punctures caused by the impact of sharp objects.

Another feature of the present invention is the second layer, the interwoven fabric. This fabric provides tensile strength, which allows the belt to withstand greater threes imparted by heavier loads. Moreover, the density of the interwoven fabric minimizes the chances of the belt being pierced by sharp objects. In addition, the use of a fabric material does not detract from the flexibility of the first and third layers.

Still another feature of the present invention is the reinforcement rods interwoven in the second layer. By inserting such rods transversely at intervals, they dislodge sharp objects that have penetrated the belt and become wedged between the interior of the belt and a "pinch" point. This protective feature reduces the occurrence of long tears and subsequently increases the life of the belt.

Still yet another feature of the present invention is the method for inserting the rods. In manufacturing the interwoven fabric, successive bobbins are used to supply threads of fabric that occupy weft sites. In a preferred embodiment of the present invention, when one such bobbin is exhausted, the reinforcement rod is placed in the next weft thread site. A new bobbin is then inserted and the weaving process continues. This method of insertion is simple and cost-efficient, and results in a rod being inserted at reasonably close intervals.

Other features and advantages of the present invention will be apparent to those skilled in the art from a careful reading of the Detailed Description of A Preferred Embodiment accompanied by the following drawings.

BRIEF DESCRIPTION OF THE DRAWINGS

In the drawings.

FIG. 1 is a cross-sectional side view of a conveyor belt according to a preferred embodiment of the present invention:

FIG. 2 is a cross-sectional side view of a conveyor belt according to an alternative embodiment of the present invention:

FIG. 3 is a cross sectional side view of a conveyor belt according to another alternative embodiment of the present invention FIG. 4 is a perspective view of a prior art conveyor belt exhibiting longitudinal splitting;

FIG. 5 is perspective view of an embodiment of the present invention.

FIG. 6 is a perspective view of an embodiment of the present invention exhibiting resistance to longitudinal splitting; and FIG. 7 is alternative perspective view of an embodiment of the present invention exhibiting resistance to longitudinal splitting.

DETAILED DESCRIPTION OF PREFERRED EMBODIMENTS

The present invention is a conveyor belt used to transport objects from one location to another. FIG. 1 shows a preferred embodiment of the present invention in cross-section and generally indicated by reference numeral 10. Belt 10 comprises a first layer 20, a second layer 30 and third layer 40. First layer 20 and third layer 40 are preferably made of any durable, non-reactive, abrasion-, puncture- and corrosion-resistant material. Materials suitable for this purpose include plastics rubber, synthetic rubber, polyvinylchloride, and polyurethane. Preferably, outer surface 45 of third layer 40 is textured to provide additional traction against rollers or drive wheels that move belt 10.

Second layer 30 is made of a fabric that provides adequate tensile strength, flexibility and puncture resistance. Suitable materials for layer 30 include, three-ply-cotton, interwoven three-ply-cotton, polyester and nylon. For uniform load applications, three-ply-cotton or interwoven three-ply cotton provides the requisite tensile strength for second layer 30 and is therefore a suitable material. Furthermore, when using three-ply-cotton or interwoven three-ply-cotton, adhesion requirements dictate the use of rubber or synthetic rubber for layers 20 and 40. For non-uniform load applications, second layer 30 should be of a material having greater tensile strength, such as polyester or nylon.

FIG. 2 shows an alternative embodiment of the present invention comprising first layer 20, second layer 30, third layer 40 and reinforcement rod 50. In this embodiment, second layer 30 is made of three-ply-cotton. Reinforcement rod 50 is woven into middle layer 60 of second layer 30 in place of a weft thread. If additional tensile strength is required due to particular load characteristics, second layer 30 can be constructed of interwoven three-ply-cotton, as shown in FIG. 3.

Reinforcement rod 50 is preferably a stainless steel or spring steel and is of a gauge that is consistent with the size of the threads it is interwoven among in second layer 30, preferably a gauge of approximately 0.062. Additionally, rod 50 should be of sufficient strength to dislodge objects that have penetrated, and would otherwise longitudinally split belt 10. Preferably, rods 50 are placed at least ten inches apart. Under optimum conditions, rod 50 is placed in the weft thread site that exists after one bobbin is exhausted and before the succeeding bobbin is inserted, approximately 16 inches apart.

FIGS. 5, 6 and 7 show the present invention in operation, and in particular, rod 50 acting to break up object 70 from belt 10. FIG. 5 shows object 70 embedded in belt 10 and wedged against equipment 90. Left in this state, object 70 would longitudinally cut belt 10 thereby diminishing its useful life. FIG. 6 shows rod 50 contacting the portion of object 70 embedded within belt 10 and imparting a force thereon to break up object 70 and allow it to pass under equipment 90. FIG. 7 illustrates rod 50 imparting a force upon object 70 sufficient to dislodge it from the interior of belt 10, thereby preventing its destruction.

It will be apparent to those skilled in the art that many modifications and substitutions can be made to the foregoing preferred embodiment without departing from the spirit and scope of the present invention, which is defined by the appended claims.

What is claimed is:

1. A device for conveying objects from one location to another, said device comprising:

a first layer;

a second layer comprising a woven fabric, said fabric having a plurality of weft threads;

a third layer, said first and said third layers adhered to said second layer; and a plurality of reinforcing rods interwoven in said second layer parallel to said weft threads, wherein each rod of said plurality of rods is inserted in said second layer between successive bobbins of weft threads.

2. The device as recited in claim 1, wherein said second layer further comprises a top layer, a bottom layer, and at least one intermediate layer therebetween, said plurality of rods interwoven in said at least one intermediate layer therebetween.

3. The device as recited in claim 1, wherein said first layer and said third layer are made of a material selected from the group consisting essentially of plastic, rubber, synthetic rubber, polyvinylchloride, and polyurethane.

4. The device as recited in claim 1, wherein said second layer is made of a material selected from the group consisting essentially of three-ply-cotton, interwoven three-ply-cotton, polyester and nylon.

5. The device as recited in claim 1, wherein said first and said third layer are made of rubber and said second layer is made of interwoven three-ply-cotton.

6. The device as recited in claim 1, wherein said distance between said adjacent rods is greater than or equal to approximately 10 inches.

7. The device as recited in claim 1, wherein each rod of said plurality of rods is made of a material selected from the group consisting essentially of stainless steel and spring steel, each rod of said plurality of rods having a gauge of approximately 0.062.

8. The device as recited in claim 1, wherein said third layer has a bottom surface that is textured.

9. A carcass used to provide tensile strength and puncture resistance to conveyor belts, said carcass comprising:

a plurality of layers of fabric, said plurality of layers having a top and bottom layer and at least one intermediate layer therebetween, said top, bottom and at least one intermediate layers interwoven together, said at least one intermediate layers having weft threads; and a plurality of reinforcing rods placed at least ten inches apart and parallel to said weft threads in one intermediate layer of said at least one intermediate layer.

10. The carcass as recited in claim 9, wherein each rod of said plurality of rods is interwoven in said at least one intermediate layer such that each rod of said plurality of rods occupy a weft thread site in said at least one intermediate layer.

11. The carcass as recited in claim 9, wherein each rod of said plurality of rods is inserted in said at least one intermediate layer between successive bobbins of weft threads.

12. The carcass as recited in claim 9, wherein said top layer, said bottom layer, and said at least one intermediate layer is made of a material selected from the group consisting essentially of three-ply cotton, interwoven-three-ply cotton, polyester and nylon.

13. The carcass as recited in claim 9, wherein each rod of said plurality of rods is made of a material selected from the group consisting essentially of stainless steel and spring steel, each rod of said plurality of rods having a gauge of at least approximately 0.062.

14. A device for conveying objects from one location to another, said device comprising:

a first layer;

a second layer including a plurality of layers of fabric, said plurality of layers of fabric having a top and a bottom layer and at least one intermediate layer therebetween, said top, bottom and at least one intermediate layers interwoven layers interwoven together;

metal rods interwoven into said second layer at least ten inches apart: and a third layer, said first and said third layers adhered to said second layer.

15. The device as recited in claim 14, wherein said first layer and said third layer are made of a material selected from the group consisting essentially of plastic, rubber, synthetic rubber, polyvinylchloride, polyurethane.

16. The device as recited in claim 14, wherein said second layer is made of a material selected from the group consisting essentially of three-ply-cotton, interwoven three-ply-cotton, polyester and nylon.

17. The device as recited in claim 14, wherein said first and third layer is made of rubber and said second layer is made of three-ply-cotton.

18. The device as recited in claim 14, wherein said third layer has outer surface that is textured.

* * * * *